United States Patent
Huang

(10) Patent No.: US 8,948,737 B2
(45) Date of Patent: Feb. 3, 2015

(54) COMMUNICATION DEVICE AND METHOD FOR SWITCHING PHONE NUMBERS USING THE SAME

(75) Inventor: Fei Huang, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 254 days.

(21) Appl. No.: 13/591,391

(22) Filed: Aug. 22, 2012

(65) Prior Publication Data

US 2013/0288657 A1 Oct. 31, 2013

(30) Foreign Application Priority Data

Apr. 26, 2012 (CN) .......................... 2012 1 0126294

(51) Int. Cl.
*H04M 3/00* (2006.01)

(52) U.S. Cl.
USPC .......................................... 455/418; 455/432

(58) Field of Classification Search
CPC ............... H04W 88/06; H04W 36/00
USPC ................................. 455/418, 551
See application file for complete search history.

(56) References Cited

U.S. PATENT DOCUMENTS

| | | | | |
|---|---|---|---|---|
| 5,764,730 A * | 6/1998 | Rabe et al. | ..................... | 455/403 |
| 5,987,325 A * | 11/1999 | Tayloe | ....................... | 455/435.2 |
| 6,212,372 B1 * | 4/2001 | Julin | .............................. | 455/418 |
| 6,671,523 B1 * | 12/2003 | Niepel et al. | .................. | 455/558 |
| 6,738,622 B1 * | 5/2004 | Stadelmann et al. | ...... | 455/435.1 |
| 6,856,818 B1 * | 2/2005 | Ford | ............................... | 455/558 |
| 6,978,156 B1 * | 12/2005 | Papadopoulos et al. | ...... | 455/558 |
| 8,175,622 B2 * | 5/2012 | Jiang | .............................. | 455/461 |
| 2002/0061745 A1 * | 5/2002 | Ahn et al. | ..................... | 455/432 |
| 2003/0050047 A1 * | 3/2003 | Ala-Luukko | ................. | 455/412 |

* cited by examiner

Primary Examiner — Charles Shedrick
(74) Attorney, Agent, or Firm — Novak Druce Connolly Bove + Quigg LLP

(57) ABSTRACT

In a method of switching between phone numbers of a communication device, a Subscriber Identity Module (SIM) card of the communication device receives Location Area Identity (LAI) information. Upon receiving the LAI information, the SIM card determines whether a Mobile Country Code (MCC) of the LAI information is consistent with an MCC of International Mobile Subscriber Identity (IMSI) of an activated phone number. The communication device switches an inactivated phone number to be activated when the MCC of the LAI information is inconsistent with the MCC of the activated phone number.

15 Claims, 3 Drawing Sheets

COMMUNICATION DEVICE AND METHOD FOR SWITCHING PHONE NUMBERS USING THE SAME

BACKGROUND

1. Technical Field

Embodiments of the present disclosure relate to communication technology, and more particularly to a communication device and a method for switching phone numbers of the communication device.

2. Description of Related Art

The Global System of Mobile Communication (GSM) standard makes international roaming virtually problem-free. However, international roaming charges for global travel can be expensive. Therefore, people who frequently travel between two areas having different cell phone service providers. For example, a person who travels between the city of Shenzhen in mainland China to the Island of Hong Kong may buy a Subscriber Identity Module (SIM) card having two phone numbers, one is the Shenzhen phone number and the other is Hong Kong phone number. When he or she stays in Shenzhen, the Shenzhen phone number may be used, and when he or she stays in Hong Kong, the Hong Kong phone number may be used to avoid international roaming charge. However, people who use the SIM card with two phone numbers have to manually switch between the phone numbers, which is not convenient, what is needed, therefore, is a communication device and a method to overcome aforementioned problems.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
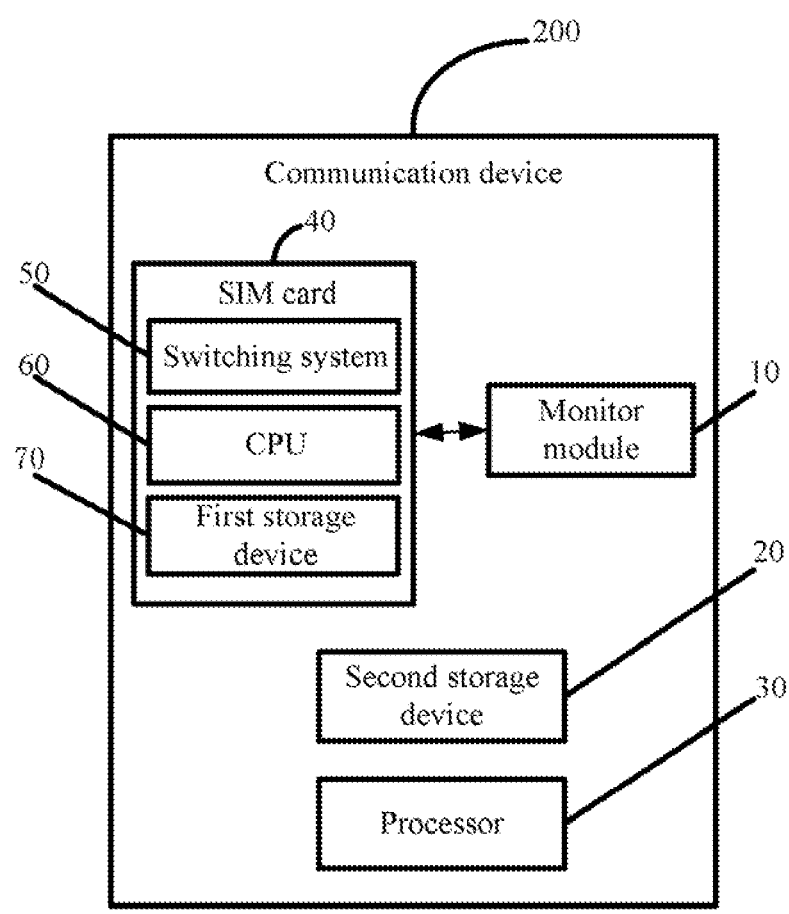
FIG. 1 is a schematic diagram of one embodiment of a communication device.

FIG. 1 is a schematic diagram of one embodiment of a communication device 200. The communication device 200 may be a mobile phone, a personal digital assistant (PDA), or other computing device. The communication device 200 includes a monitor module 10, a second storage device 20, at least one processor 30, and a Subscriber Identity Module (SIM) card 40.

The monitor module 10 may include computerized code in the form of one or more programs that are stored in the second storage device 20, the computerized code includes instructions that are executed by the at least one processor 30 to provide functions for the monitor module 10. In one embodiment, the monitor module 10 monitors a rejected message from the Global System for Mobile communication (GSM) network, the rejected message represents that a location update of the communication device 200 is not accepted by the GSM network, the rejected message includes a reason for rejection and Location Area Identity (LAI) information. In one embodiment, the monitor module 10 sends the LAI information to the SIM card 40 when the reason for rejection in the message indicates that public land mobile network (PLMN) does not allow the location update of the communication device 200. The LAI information includes a three-digit Mobile Country Code (MCC), a two to three digit Mobile Network Code (MNC) that identifies the GSM PLMN in a country, and a Location Area Code (LAC) which is a 16 bit number for allowing 65536 location areas within one GSM PLMN.

The SIM card 40 is a smart card, and includes a switching system 50, a central processing unit (CPU) 60 and a first storage device 70. The first storage device 70 stores a plurality of phone numbers of the SIM card 40, in some embodiments, the first storage device 70 stores a first phone number and a second phone number of the SIM card 40. Each International Mobile Subscriber Identity (IMSI) of the first and second phone numbers is presented as a 15 digit number, and may be shorter. The first three digits represent the MCC, the next two or three digits represent the MNC. Shenzhen and Hong Kong mainly use the two-digit MNCs. The next digits represent the Mobile Subscriber Identification Number (MSIN).

In one embodiment, the first phone number is activated while the second phone number is inactivated. For example, if the first phone number is a Shenzhen phone number and the second phone number is a Hong Kong phone number, when the user of the communication device 200 uses the Shenzhen phone number in Shenzhen, it is the Shenzhen phone number which is activated in the communication device 200, and the Hong Kong phone number is inactivated.

The switching system 50 is used to automatically switch the inactivated phone number to be activated when the MCC of the LAI information is inconsistent with the MCC of the IMSI of the activated phone number.

The communication device 200 is generally controlled and coordinated by an operating system, such as UNIX, LINUX, WINDOWS, MAC OS X, an embedded operating system, or any other compatible operating systems. In other embodiments, the communication device 200 may be controlled by a proprietary operating system. All such operating systems control and schedule computer processes for execution, perform memory management, provide a file system, networking, and I/O services, and provide a user interface, such as a graphical user interface (GUI), among other things.

Figure 2:
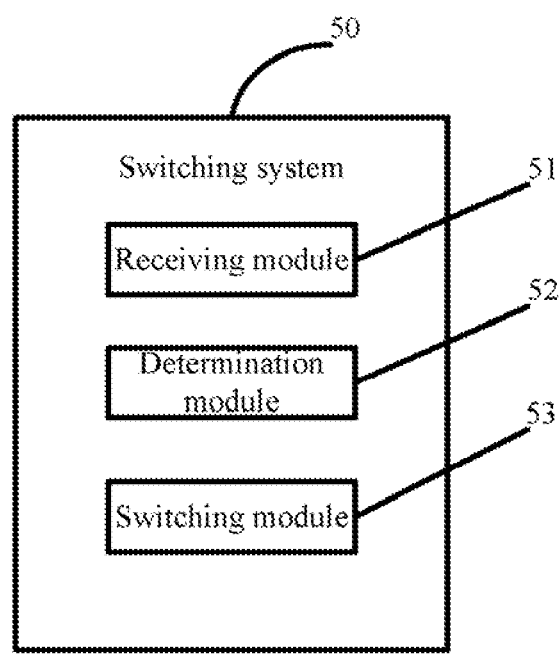
FIG. 2 is a block diagram of function modules of a switching system included in a SIM card of the communication device of FIG. 1.

FIG. 2 is a block diagram of function modules of the switching system 50 included in the SIM card 40 of the communication device 200 of FIG. 1. The switching system 50 may include computerized code in the form of one or more programs that are stored in the first storage device 70. The computerized code includes instructions that are executed by the CPU 60 of the SIM card 40 to provide functions for the switching system 50. The switching system 50 includes a receiving module 51, a determination module 52, and a switching module 53. A description of the switching system 50 follows.

Figure 3:
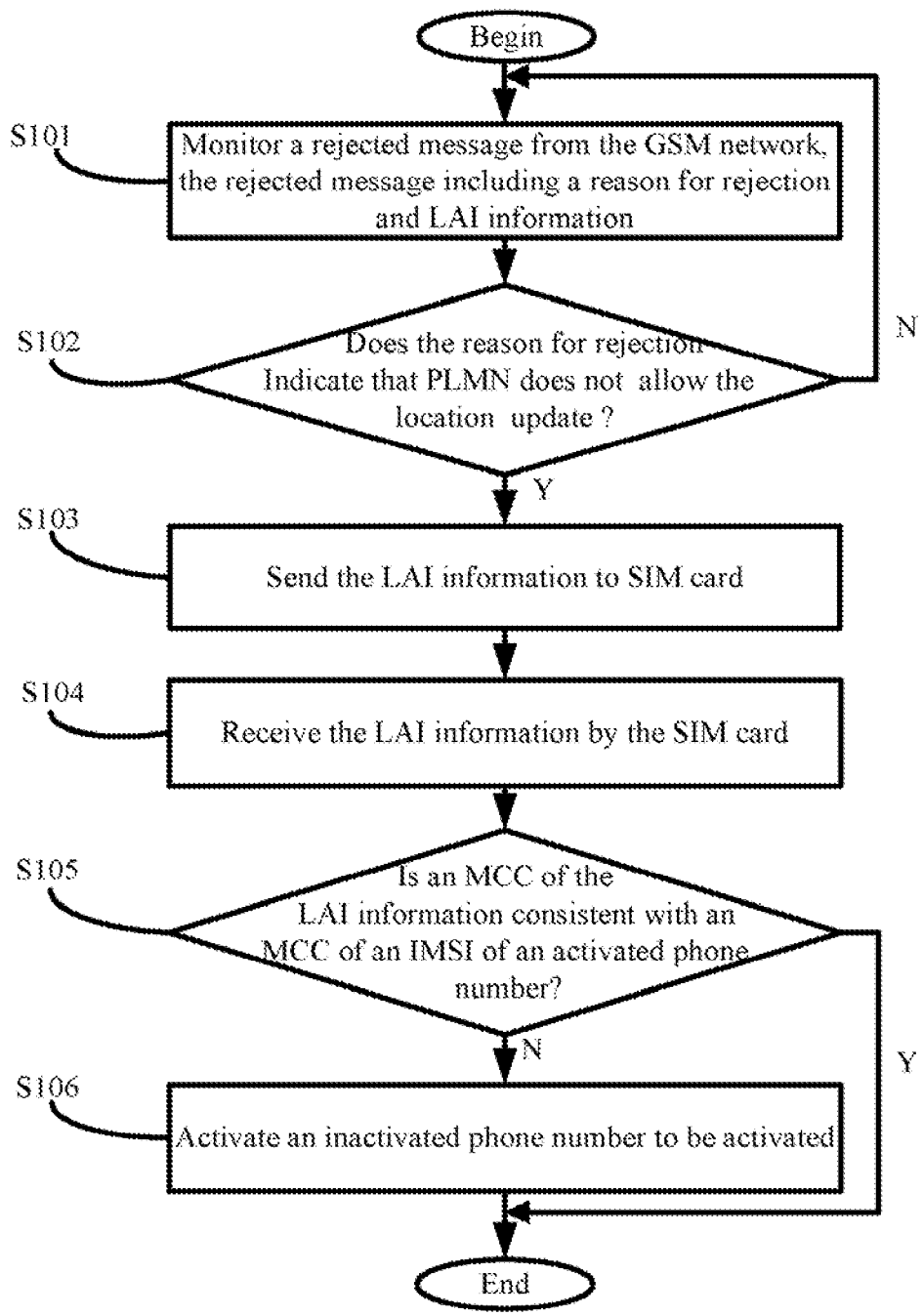
FIG. 3 is a flowchart of one embodiment of a method for switching phone numbers of the communication device of FIG. 1.

FIG. 3 is a flowchart of one embodiment of a method for switching phone numbers of a communication device 200. Depending on the embodiment, additional steps may be added, others deleted, and the ordering of the steps may be changed.

In step S101, the monitor module 10 monitors a rejected message from the Global System for Mobile communication (GSM) network, the rejected message represents that a location update of the communication device 200 is not accepted by the GSM network. The rejected message may include a reason for rejection and Location Area Identity (LAI) information. In one embodiment, the location update is a periodic location update. There are three types of location update defined in the GSM standard, such as normal location update, International Mobile Subscriber Identity (IMSI) attach location update, and periodic location update. The periodic location update is a coercive measure taken by the GSM network for the communication device 200, the coercive measure requires the communication device 200 to regularly report its location at a preset time intervals, to make the GSM network be aware of the locations of the communication device 200.

For example, the Shenzhen phone number is activated while the Hong Kong phone number is inactivated in the communication device 200. If the user disables the international roaming function of the Shenzhen phone number, then when the communication device 200 makes periodic location update to report the location to the GSM network in Hong Kong, the GSM network will find out that international roaming for the Shenzhen phone number in Hong Kong is limited, the GSM network will send the rejected message to the communication device 200 which includes the reason for rejection and the LAI information.

In step S102, the monitor module 10 determines whether the reason for rejection in the message indicates that PLMN does not allow the location update of the communication device 200. In one embodiment, the reason for rejection in the rejected message may be represented as "PLMN not allowed". If the reason for rejection in the message indicates that PLMN does not allow the location update of the communication device 200, step 103 is implemented. If the reason for rejection in the message does not indicate that PLMN does not allow the location update of the communication device 200, step S101 is implemented, that is, the monitor module 10 continues to monitor other rejected messages from the GSM network.

In step S103, the monitor module 10 sends the LAI information to the SIM card 40. In one embodiment, the monitor module 10 sends the LAI information to the SIM card 40 after a predetermined time interval (e.g., ten minutes) when the reason for rejection in the rejected message indicates that the PLMN does not allow the location update of the communication device 200.

In step S104, the receiving module 51 receives the LAI information.

In step S105, the determination module 52 determines whether an MCC of the LAI information is consistent with an MCC of IMSI of the activated phone number of the SIM card 40. If the MCC of the LAI information is inconsistent with the MCC of IMSI of the activated phone number of the SIM card 40, step 106 is implemented. If the MCC of the LAI information is consistent with the MCC of the IMSI of the activated phone number of the SIM card 40, the process is ended.

In step S106, the switching module 53 activates the inactivated phone number. For example, the switching module 53 activates the Hong Kong phone number, and the Shenzhen phone number is deactivated at the same time.

Although embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device, comprising:
   a Subscriber Identity Module (SIM) card comprising a central processing unit (CPU) and a first storage device, the first storage device storing a first phone number and a second phone number of the SIM card; and
   one or more programs that are stored in the first storage device and are executed by the CPU of the SIM card, the one or more programs comprising:
   a receiving module that receives Location Area Identity (LAI) information from the Global System for Mobile communication (GSM) network;
   a determination module that determines whether a Mobile Country Code (MCC) of the LAI information is consistent with an MCC of an International Mobile Subscriber Identity (IMSI) of the first phone number of the SIM card, the first phone number being activated while the second phone number being inactivated; and
   a switching module that activates the second phone number when the MCC of the LAI information is inconsistent with the MCC of IMSI of the first phone number.

2. The communication device of claim 1, wherein the communication device further comprises:
   a second storage device;
   at least one processor; and
   one or more programs that are stored in the second storage device and executed by the at least one processor, the one or more programs comprising:
   a monitor module that monitors a rejected message from the GSM network, the rejected message representing that a location update of the communication device not accepted by the GSM network, and the rejected message comprising a reason for rejection and the LAI information; and
   the monitor module sends the LAI information to the SIM card when the reason for rejection in the message indicates that public land mobile network (PLMN) does not allow the location update of the communication device.

3. The communication device of claim 2, wherein the location update is a periodic location update.

4. The communication device of claim 2, wherein the monitor module sends the LAI information to the SIM card after a predetermined time interval when the reason for rejection in the rejected message indicates that the PLMN does not allow the location update of the communication device.

5. The communication device of claim 2, wherein the rejected message indicates that the PLMN does not allow the location update of the communication device is represented as "PLMN not allowed".

6. A method for switching phone numbers of a communication device, the method comprising:
   receiving, at the communication device, Location Area Identity (LAI) information from the Global System for Mobile communication (GSM) network, wherein the communication device having a SIM card, the SIM card can be switched between a first phone number and a second phone number;
   determining, at the communication device, whether a Mobile Country Code (MCC) of the LAI information is consistent with an MCC of an International Mobile Subscriber Identity (IMSI) of the first phone number of the Subscriber Identity Module (SIM) card, the first phone number being activated while the second phone number being inactivated; and activating, at the communication device, the second phone number when the MCC of the LAI information is inconsistent with the MCC of IMSI of the first phone number.

7. The method of claim 6, further comprising:

monitoring, at the communication device, a rejected message from the GSM network by a monitor module of the communication device, the rejected message representing that a location update of the communication device not accepted by the GSM network, and the rejected message comprising a reason for rejection and the LAI information; and sending, at the communication device to the SIM card, the LAI information when the reason for rejection in the message indicates that public land mobile network (PLMN) does not allow the location update of the communication device.

8. The method of claim 7, wherein the location update is a periodic location update.

9. The method of claim 7, wherein the monitor module sends the LAI information to the SIM card after a predetermined time interval when the reason for rejection in the rejected message indicates that the PLMN does not allow the location update of the communication device.

10. The method of claim 7, wherein the rejected message indicates that the PLMN does not allow the location update of the communication device is represented as "PLMN not allowed".

11. A non-transitory storage medium having stored thereon instructions that, when executed by a central processing unit (CPU) of a communication device having a Subscriber Identity Module (SIM) card, causes the communication device to perform a method for switching the communication device between a first phone number and a second phone number, the method comprising:

receiving Location Area Identity (LAI) information from the Global System for Mobile communication (GSM) network;

determining whether a Mobile Country Code (MCC) of the LAI information is consistent with an MCC of an International Mobile Subscriber Identity (IMSI) of the first phone number of the SIM card, the first phone number being activated while the second phone number being inactivated; and activating the second phone number when the MCC of the LAI information is inconsistent with the MCC of IMSI of the first phone number.

12. The storage medium of claim 11, wherein the method further comprises:

monitoring a rejected message from the GSM network by a monitor module of the communication device, the rejected message representing that a location update of the communication device not accepted by the GSM network, and the rejected message comprising a reason for rejection and the LAI information; and sending the LAI information to the SIM card when the reason for rejection in the message indicates that public land mobile network (PLMN) does not allow the location update of the communication device.

13. The storage medium of claim 12, wherein the location update is a periodic location update.

14. The storage medium of claim 12, wherein the monitor module sends the LAI information to the SIM card after a predetermined time interval when the reason for rejection in the rejected message indicates that the PLMN does not allow the location update of the communication device.

15. The storage medium of claim 12, wherein the rejected message indicates that the PLMN does not allow the location update of the communication device is represented as "PLMN not allowed".

* * * * *